(12) United States Patent
Yu

(10) Patent No.: US 8,842,234 B2
(45) Date of Patent: Sep. 23, 2014

(54) BACKLIGHT MODULE AND LCD DEVICE HAVING A GAP BETWEEN A TOP OF A SIDE WALL OF A REAR PANEL AND A GROOVE ON TOP OF THE SIDE WALL

(75) Inventor: Yajun Yu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 405 days.

(21) Appl. No.: 13/500,804

(22) PCT Filed: Mar. 16, 2012

(86) PCT No.: PCT/CN2012/072415
§ 371 (c)(1),
(2), (4) Date: Apr. 6, 2012

(87) PCT Pub. No.: WO2013/134943
PCT Pub. Date: Sep. 19, 2013

(65) Prior Publication Data
US 2013/0242224 A1  Sep. 19, 2013

(30) Foreign Application Priority Data
Mar. 15, 2012 (CN) .......................... 2012 1 0068982

(51) Int. Cl.
*G02F 1/1333* (2006.01)
*G02F 1/1335* (2006.01)

(52) U.S. Cl.
USPC .................................. 349/58; 349/59; 349/63

(58) Field of Classification Search
USPC ................. 349/58–65; 362/97, 606
See application file for complete search history.

(56) References Cited

U.S. PATENT DOCUMENTS

| 7,948,577 | B2 * | 5/2011 | Kim et al. | 349/58 |
| 8,174,638 | B2 * | 5/2012 | Kim | 349/58 |
| 8,610,842 | B2 * | 12/2013 | Kim et al. | 349/58 |
| 8,724,049 | B2 * | 5/2014 | Jeong | 349/60 |
| 2009/0168431 | A1 | 7/2009 | Hsu et al. | |

FOREIGN PATENT DOCUMENTS

| CN | 1996121 A | 7/2007 |
| CN | 201354985 Y | 12/2009 |
| CN | 101676767 A | 3/2010 |
| CN | 101949498 A | 1/2011 |
| CN | 102057209 A | 5/2011 |
| CN | 102287682 A | 12/2011 |
| CN | 102313209 A | 1/2012 |
| CN | 102352991 A | 2/2012 |
| JP | 2005352427 A | 12/2005 |

OTHER PUBLICATIONS

Zhang Hua, the International Searching Authority written comments, Nov. 2012, CN.
Liu Baorong, the first office action, May 2013, CN.

* cited by examiner

Primary Examiner — Huyen Ngo
(74) Attorney, Agent, or Firm — Na Xu; IPro, Inc.

(57) ABSTRACT

The invention provides a backlight module and a LCD device. The backlight module includes a side frame, and a rear panel; the rear panel is provided with a side wall fixedly matched with the side frame, the side wall of the rear panel is provided with a light source, and a gap is reserved between the top of the side wall and the side frame. The invention can effectively block the path that the heat at the side of the light source is transferred to the LCD panel, and can effectively prevent the risk of the liquid crystal liquefaction of the LCD panel, thereby improving the optical display taste of the LCD panel.

17 Claims, 2 Drawing Sheets

BACKLIGHT MODULE AND LCD DEVICE HAVING A GAP BETWEEN A TOP OF A SIDE WALL OF A REAR PANEL AND A GROOVE ON TOP OF THE SIDE WALL

TECHNICAL FIELD

The invention relates to the field of liquid crystal displays (LCDs), and more particularly to a backlight module and a LCD device.

BACKGROUND

FIG. 1 shows a structure section of a conventional module: a frame at the side of a light emitting diode (LED) light source is directly designed to be arranged on the side wall around a rear panel in a contact mode. Because the device with a narrow frame becomes narrower and narrower, the border of the display area (AA area) of a panel is closer to the light source of a LED lightbar, and the influence of the high temperature of the LED lightbar on the panel becomes more significant. As shown in FIG. 1: the heat of the LED lightbar is upward conducted to the frame through the side wall of the rear panel, and then is conducted to the panel through a spacer, resulting in overhigh temperature of the panel, thereby seriously affecting the optical display taste and effect in the AA area, and even causing the risk of liquid crystal liquefaction of the panel by overhigh temperature.

Pat. Pub. No. U.S. 2009/0168431A1, published on Jul. 2, 2009, discloses a backlight module. The backlight module includes a light guide panel, a LED light source opposite to the light incident surface of the light guide panel, and further includes multiple air vents heatedly connected with the LED light source. The LED light source is conducted into the air vents by means of heat conduction, and then heat is conducted outside through the air convection of the air vents. The heat dissipation mode respectively includes heat conduction and air convection, thereby having low heat dissipation efficiency, and non-ideal heat dissipation effect.

Pat. Pub. No. CN201354985Y, published on Dec. 2, 2009, discloses an edge-light backlight module. The edge-light backlight module includes a lamp tube assembly which includes a lamp tube, a lamp tube reflector, and a lamp tube sleeve; the lamp tube sleeve covers the electrode part at the low-voltage end and the high-voltage end of the lamp tube to protect the lamp tube. A back frame is arranged below the lamp tube assembly to support and fix the lamp tube assembly; a rubber frame covers the lamp tube assembly; wherein, the rubber frame is provided with an opening in the lamp tube sleeve at the low-voltage end of the lamp tube, and a filter screen is arranged on the opening. The technical scheme improves the heat dissipation effect of the low-voltage end of the lamp tube of the backlight module, however, the lamp tube reflector and the lamp tube still form a close space, heat is not easy to dissipate, and the middle frame is in direct contact with the lamp tube reflector, thereby a lot of heat is still conducted to the middle frame, and then is conducted to the LCD panel.

SUMMARY

In view of the above-described problems, the aim of the invention is to provide a backlight module and a LCD device thereof capable of preventing heat from being transferred to the LCD panel from the backlight module.

The aim of the present invention is achieved by the following technical schemes.

A backlight module comprises a side frame, and a rear panel; the rear panel is provided with a side wall fixedly matched with the side frame, the side wall of the rear panel is provided with a light source, and a gap is reserved between the top of the side wall and the side frame.

Preferably, the side frame is provided with a groove in the position corresponding to the top of the side wall of the rear panel, and a gap is reserved between the top of the side wall and the groove. Because a certain gap is required to be reserved between the top of the side wall and the side frame, if the structure of the side frame is not changed, the rear panel must be backward moved to produce the gap, thereby increasing the thickness of LCD devices, which does not conform to the trend of light and thin LCD devices. After the groove is arranged in the position corresponding to the top of the side wall, on the premise of not increasing the thickness of the LCD device, the gap is reserved by avoiding design.

Preferably, the backlight module comprises a light guide panel, and an optical film arranged on the light emitting surface of the light guide panel. The side frame is provided with an extension part, the bottom surface of the extension part is provided with a lug boss for butting the edge of the light guide panel, and the bottom surface between the lug boss and the root of the extension part is provided with the groove in the position corresponding to the top of the side wall of the rear panel. This is a specific groove structure of the side frame.

Preferably, a heat-shield material is arranged between the side wall of the rear panel and the side frame. The heat-shield material can further prevent heat from being conducted to the side frame from the rear panel, and then being conducted to the LCD panel.

Preferably, the side wall of the rear panel is connected with the side frame via a fastener. This is a specific direct fixing mode of the side frame and the side wall. The contact between the rear panel and the side frame is not so close by employing the fastener connection, and even a certain gap is reserved. Thus, heat can further be prevented from being conducted to the side frame from the rear panel.

Preferably, the side wall of the rear panel is connected with the side frame via a screw or a rivet. These are the other two specific direct fixing modes of the side frame and the side wall.

Preferably, the lightbar is a LED lightbar. LED has advantages of low energy consumption, uniform luminance and long service life, and is an ideal light source.

A LCD device comprises the aforementioned backlight module.

Preferably, the outermost layer of the LCD device is further provided with a front frame, the LCD panel of the LCD is arranged between the front frame and the side frame, and a buffer spacer made of thermal insulating material is arranged between the front frame and the LCD panel. Heat is further prevented from being conducted to the LCD panel from the side frame by employing the thermal insulating buffer spacer.

Preferably, a buffer spacer made of thermal insulating material is arranged between the side frame and the LCD panel. Heat is further prevented from being conducted to the LCD panel from the side frame by employing the thermal insulating buffer spacer.

The inventor finds that for the LCD device with the light source arranged on the side wall of the rear panel, the top of the side wall is in direct contact with the middle frame, the contact position thereof is closest to the LCD panel; and further finds that most heat acting on the LCD panel is conducted from the top of the side wall. Therefore, a gap is reserved between the top of the side wall and the side frame in the invention. Because the heat resistance of air is high and can nearly effectively prevent heat from being directly transferred to the upper part of the side frame in the direction, and then can prevent the heat of the light source from being transferred to the liquid crystals in the direction, thereby avoiding the large influence on the temperature of the LCD panel. Therefore, the invention can effectively block the path that the heat at the side of the light source is transferred to the LCD panel, and can effectively prevent the risk of the liquid crystal liquefaction of the LCD panel, thereby improving the optical display taste of the LCD panel.

DETAILED DESCRIPTION

The invention will be further described in accordance with the figures and the preferred examples.

Figure 1:
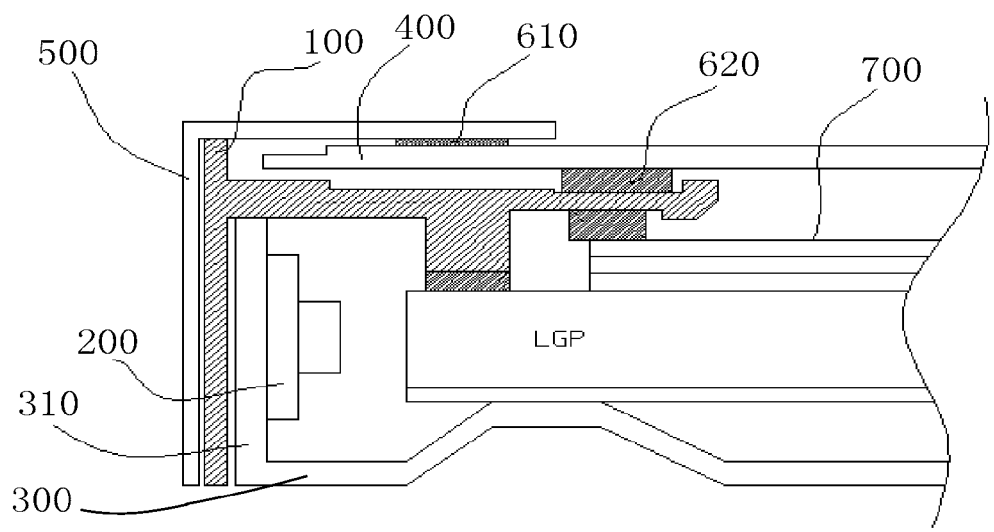
FIG. 1 is a structure diagram of a conventional LCD device.
Figure 2:
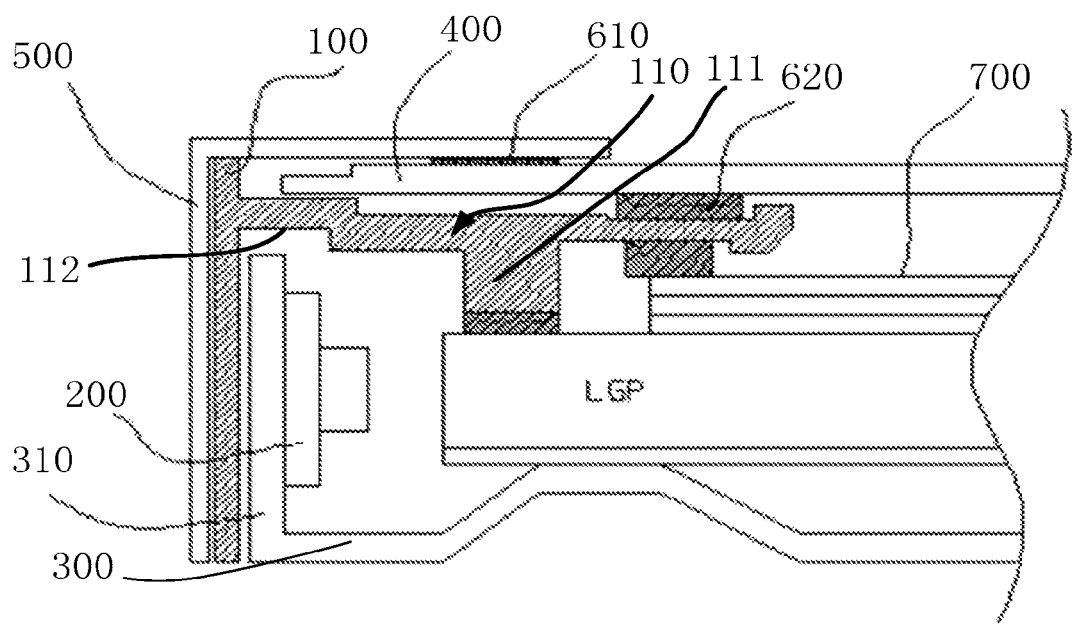
FIG. 2 is a structure diagram of a LCD device of the invention.

As shown in FIG. 2, a LCD device comprises a LCD panel and a backlight module; structurally, the LCD device sequentially comprises a front frame 500, a side frame 100, and a rear panel 300 from outside to inside; a LCD panel 400 is arranged between the front frame 500 and the side frame 100, and the rear panel 300 is sequentially stacked with a light guide panel and an optical film 700. The LCD panel 400 is positioned between the front frame 500 and the side frame 100. Therefore, The places where the LCD panel 400 is in contact with the two are respectively provided with a buffer spacer; the buffer spacer arranged between the LCD panel 400 and the front frame 500 is an upper buffer spacer 610, and the buffer spacer arranged between the LCD panel 400 and the side frame 100 is a lower buffer spacer 620. The periphery of the rear panel 300 is provided with a side wall 310 fixedly matched with the side frame 100, the side wall 310 is provided with a light source, and a gap is reserved between the top of the side wall 310 and the side frame 100. Preferably, the light source is a LED lightbar 200. LED has advantages of low energy consumption, uniform luminance and long service life, and is an ideal light source. Of course, light sources such as cold cathode fluorescent lamp (CCFL), etc. also can be applied to the invention.

The side frame is provided with an extension part 110, the bottom surface of the extension part 110 is provided with a lug boss 111 for butting the edge of the light guide panel, the bottom surface between the lug boss 111 and the root of the extension part 110 is provided with a groove 112 in the position corresponding to the top of the side wall 310 of the rear panel, and a gap is reserved between the top of the side wall 310 and the groove 112. Thus, it is not necessary to move the rear panel to produce the gap, on the premise of not increasing the thickness of the LCD device, the gap is reserved by directly arranging the groove 112 in the side frame 100 by employing the avoiding design.

Figure 3:
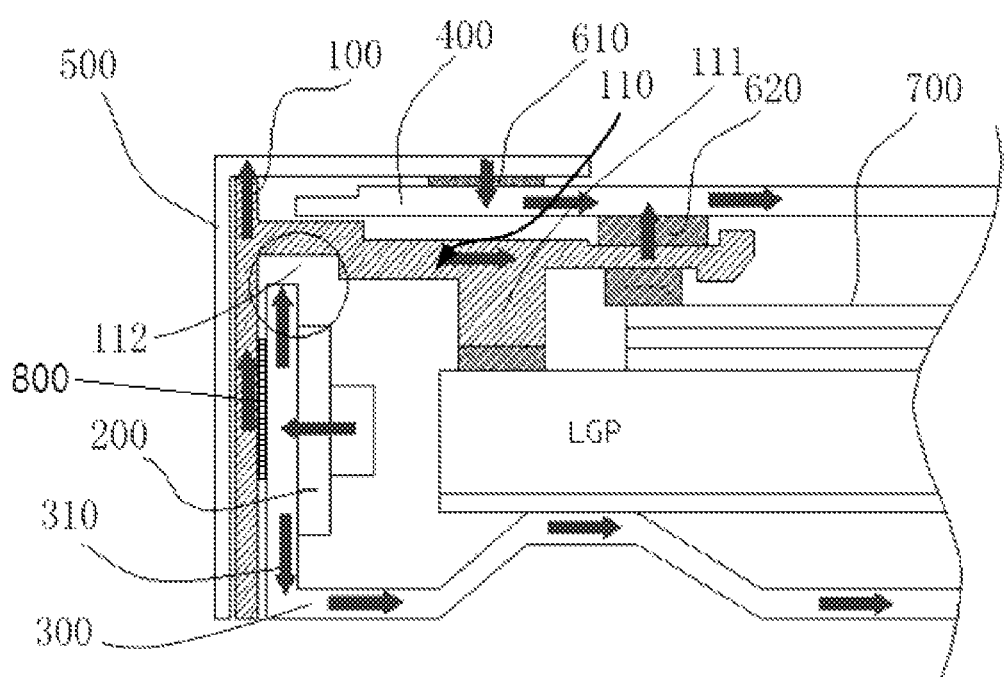
FIG. 3 is a schematic diagram of heat conduction of a LCD device of the invention;
Wherein: 100. side frame; 110. extension part; 111. lug boss; 122. groove; 200. LED lightbar; 300. rear panel; 310. side wall; 400. LCD panel; 500. front frame; 610. upper buffer spacer; 620. lower buffer spacer; 700. optical film; 800. heat-shield material.

As shown in FIG. 3, although the gap reserved at the top of the side wall 310 can prevent most heat from being transferred to the LCD panel 400, because the side wall 310 of the rear panel and the side frame 100 are fixed by one or more modes of fastener connection, screw connection, rivet connection, etc., a contact surface still unavoidably exists between the side wall 310 of the rear panel and the middle frame. Thus, a small part of heat is conducted to the side frame 100 through the side wall 310 of the rear panel and then is dissipated through the side frame 100, and a part of the heat is transferred to the front frame 500 and then is transferred to the LCD panel 400 through the upper buffer spacer 610; the rest part of the heat is transferred to the LCD panel 400 from the side frame 100 through the lower buffer spacer 620, thereby resulting in the temperature rise of the LCD panel 400.

In the conventional structure, the upper buffer spacer 610 and the lower buffer spacer 620 are mainly stuck with buffer antiskid material to protect the LCD panel 400 from damage without considering heat transfer. The invention employs a material with the functions of heat insulation or heat absorption, buffer and skid prevention to replace the conventional upper buffer spacer 610 and lower buffer spacer 620, to achieve the purpose that a part of residual heat transferred to the place is prevented from being transferred to the LCD panel 400.

Further, a heat-shield material 800 can be arranged between the side wall 310 and the side frame 100, to further prevent heat from being conducted to the side frame 100 from the rear panel 300 and then being conducted to the LCD panel 400.

The invention is described in detail in accordance with the above contents with the specific preferred examples. However, this invention is not limited to the specific examples. For the ordinary technical personnel of the technical field of the present invention, all the methods of adding heat insulation between the heat source and the LCD panel should be considered to belong to the protection scope of the present invention.

We claim:

1. A LCD device, comprising a backlight module and a LCD panel; said backlight module comprises a side frame, a rear panel, a light guide panel, and an optical film arranged on the light emitting surface of the light guide panel; said rear panel is provided with a side wall fixedly matched with said side frame, the side wall of said rear panel is provided with a light source, said side frame is provided with an extension part, the bottom surface of said extension part is provided with a lug boss for butting the edge of the light guide panel, the bottom surface between said lug boss and the root of said extension part is provided with a groove in the position corresponding to the top of the side wall of said rear panel, and a gap is reserved between the top of said side wall and said groove; a heat-shield material is arranged between the side wall of said rear panel and said side frame; the side wall of said rear panel is connected with said side frame via a fastener, a screw or a rivet; the outermost layer of said LCD device is further provided with a front frame, said LCD panel is arranged between said front frame and said side frame, and a buffer spacer made of thermal insulating material is arranged between said front frame and said LCD panel; a buffer spacer made of thermal insulating material is arranged between said side frame and said LCD panel.

2. A backlight module, comprising: a side frame, and a rear panel; said rear panel is provided with a side wall fixedly matched with said side frame, the side wall of said rear panel is provided with a light source, and a gap is reserved between the top of said side wall and said side frame.

3. The backlight module of claim 2, wherein said side frame is provided with a groove in the position corresponding to the top of the side wall of said rear panel, and a gap is reserved between the top of said side wall and said groove.

4. The backlight module of claim 3, wherein said backlight module comprises a light guide panel, and an optical film arranged on the light emitting surface of the light guide panel; said side frame is provided with an extension part, the bottom surface of said extension part is provided with a lug boss for butting the edge of the light guide panel, and the bottom surface between said lug boss and the root of said extension part is provided with the groove in the position corresponding to the top of the side wall of said rear panel.

5. The backlight module of claim 2, wherein a heat-shield material is arranged between the side wall of said rear panel and said side frame.

6. The LCD device of claim 2, wherein the side wall of said rear panel is connected with said side frame via a fastener.

7. The backlight module of claim 2, wherein the side wall of said rear panel is connected with said side frame via a screw or a rivet.

8. The backlight module of claim 2, wherein said light source is a LED lightbar.

9. A LCD device, comprising: a backlight module; said backlight module comprises a side frame, and a rear panel; said rear panel is provided with a side wall fixedly matched with the side frame, the side wall of said rear panel is provided with a light source, and a gap is reserved between the top of said side wall and said side frame.

10. The LCD device of claim 9, wherein said side frame is provided with a groove in the position corresponding to the top of the side wall of said rear panel, and a gap is reserved between the top of said side wall and said groove.

11. The LCD device of claim 10, wherein said backlight module comprises a light guide panel, and an optical film arranged on the light emitting surface of the light guide panel; said side frame is provided with an extension part, the bottom surface of said extension part is provided with a lug boss for butting the edge of the light guide panel, and the bottom surface between said lug boss and the root of said extension part is provided with the groove in the position corresponding to the top of the side wall of said rear panel.

12. The LCD device of claim 9, wherein a heat-shield material is arranged between the side wall of said rear panel and said side frame.

13. The LCD device of claim 9, wherein the side wall of said rear panel is connected with said side frame via a fastener.

14. The LCD device of claim 9, wherein the side wall of said rear panel is connected with said side frame via a screw or a rivet.

15. The LCD device of claim 9, wherein said light source is a LED lightbar.

16. The LCD device of claim 9, wherein the outermost layer of said LCD device is further provided with a front frame, the LCD panel of said LCD device is arranged between said front frame and said side frame, and a buffer spacer made of thermal insulating material is arranged between said front frame and said LCD panel.

17. The LCD device of claim 9, wherein a buffer spacer made of thermal insulating material is arranged between said side frame and said LCD panel.

\* \* \* \* \*